C. R. VAN HOESEN.
COASTING-SLED.

No. 191,496. Patented May 29, 1877.

WITNESSES
M. P. Utley
F. J. Masi

INVENTOR
Charles R. Van Hoesen,
by E. W. Anderson
ATTORNEY

UNITED STATES PATENT OFFICE.

CHARLES R. VAN HOESEN, OF NEW YORK, N. Y.

IMPROVEMENT IN COASTING-SLEDS.

Specification forming part of Letters Patent No. 191,496, dated May 29, 1877; application filed April 4, 1877.

*To all whom it may concern:*

Be it known that I, CHARLES R. VAN HOESEN, of New York, in the county of New York and State of New York, have invented a new and valuable Improvement in Coasting-Sleds; and I do hereby declare that the following is a full, clear, and exact description of the construction and operation of the same, reference being had to the annexed drawings, making a part of this specification, and to the letters and figures of reference marked thereon.

Figure 1:
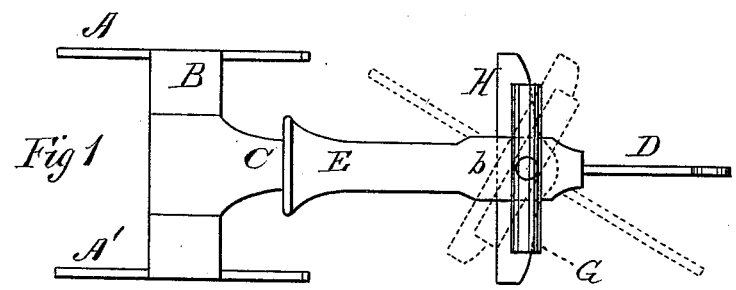
Figure 2:
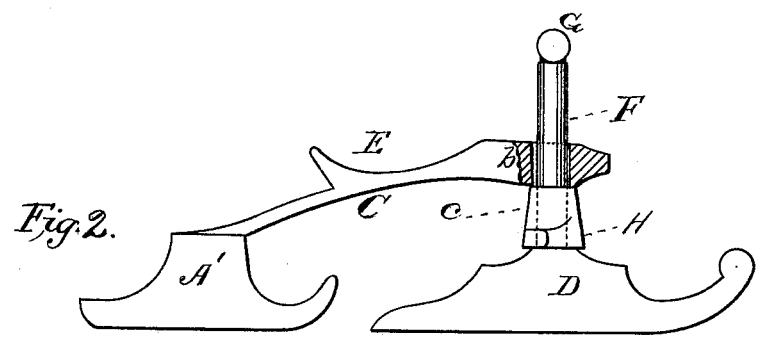
Figure 3:
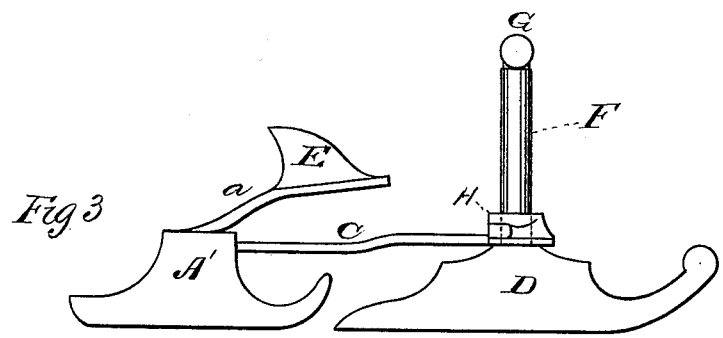

Figure 1 of the drawings is a representation of a top view of this invention. Fig. 2 is a side view of the same with saddle-seat. Fig. 3 is a side view of the same with guarded seat.

This invention has relation to improvements in coasting-sleds.

The object of my invention is to devise a sled of this description that is adapted for the use of persons of both sexes, and is capable of being directed to the right or left, or of being stopped, without bringing any part of the rider's person in contact with the frozen surface of the snow.

The nature of the invention consists in a sled having a front supporting-runner that is adjustable at pleasure to the right or left, so as to give the sled a corresponding direction, and that is capable of having its front end raised and its rear end lowered, thereby cutting into the snow after the manner of a skate, and stopping the sled, as will be hereinafter more fully explained.

In the accompanying drawings, the letters A A' designate the rear spaced runners of my improved sled, that are braced and held parallel to each other by a transverse bar or platform, B.

C represents a preferably arched reach-bar that extends from the runners A A' to the front runner D, and is rigidly secured at its rear end to the brace B. The reach-bar C usually supports a seat, E, and has a certain spring action, but I sometimes secure the seat to the front end of a spring-arm, $a$, that has its rear end secured to bar or platform B, aforesaid, and is entirely independent of the said reach. In this case the curvature or arch of the reach is very slight, or may be dispensed with altogether. The front end of the reach C is horizontally widened and vertically thickened, as shown at $b$, and affords a bearing for a vertical shaft, F, to the lower end of which is secured the front runner D. The shaft F rotates easily in its bearings, and is provided upon its upper end with a cross-handle, G, that is at right angles to the plane of the runner. By turning this handle to the right or left the runner will be inclined in a corresponding degree, and the sled guided or steered to the right or left, thus enabling the rider to avoid obstacles in the road, and prevent collisions therewith. The enlarged head of the reach bears down upon a broad collar, $c$, rigidly secured to the operating shaft F of the front runner, the said collar being an upward extension of a foot-rest, H, that is parallel to the cross-handle G, and at right angles to the length of the said runner. By this means both the hands and feet may be employed advantageously in steering the sled either in the direct line or to the right and left. The shaft F, aforesaid, has a slight play or rather vibration toward the rider on the seat E, so that he can, by drawing forcibly backward upon the cross-handle, raise the front end of the front runner and bury its heel in the snow, so as to give it, in addition to the steering function, the properties of a brake, whereby the speed of the sled may be moderated at pleasure, or its progress altogether arrested.

It will be seen that my improved sled is capable of being steered and stopped without any part of the person being brought into contact with the surface of the snow. When I use a spring-seat, as shown in Fig. 3, and the reach is straight, the foot-rest will be preferably secured to the front end of the said reach, and the operating shaft F will have one of the sections of a fifth-wheel attachment.

Having described my invention, what I claim as new, and desire to secure by Letters Patent, is—

In a coasting-sled, the combination, with the runners A A' attached to transverse bar B, the reach bar C, and elevated seat E, of the horizontally-vibrating front supporting-runner D with guide foot-rest H journaled in the free end of said bar, and a handle for operating the same, substantially as specified.

In testimony that I claim the above I have hereunto subscribed my name in the presence of two witnesses.

CHARLES R. VAN HOESEN.

Witnesses:
ANDREW SAUL,
EDWIN F. CORRY.